US00RE41836E

(19) United States
(12) Reissued Patent
Schnell

(10) Patent Number: US RE41,836 E
(45) Date of Reissued Patent: Oct. 19, 2010

(54) MIRROR SYSTEM WITH VARYING CHARACTERISTICS BASED ON VEHICLE POSITIONING

(75) Inventor: Rob Schnell, Sylvania, OH (US)

(73) Assignee: Magna Mirrors of America, Inc., Kentwood, MI (US)

(21) Appl. No.: 12/166,445

(22) Filed: Jul. 2, 2008

Related U.S. Patent Documents

Reissue of:
(64) Patent No.: 7,168,818
Issued: Jan. 30, 2007
Appl. No.: 10/905,330
Filed: Dec. 28, 2004

U.S. Applications:
(60) Provisional application No. 60/481,837, filed on Dec. 29, 2003.

(51) Int. Cl.
*G02B 7/182* (2006.01)
*B60R 1/06* (2006.01)

(52) U.S. Cl. ..... 359/871; 248/475.1

(58) Field of Classification Search ..... 359/871, 359/841, 872; 248/475.1
See application file for complete search history.

(56) References Cited

U.S. PATENT DOCUMENTS 6,336,726 B1 * 1/2002 Lang et al. ..... 359/871
2003/0086191 A1 5/2003 Nielsen et al.
2005/0141115 A1 6/2005 Foote et al.

* cited by examiner

*Primary Examiner*—Alessandro Amari
(74) *Attorney, Agent, or Firm*—McGarry Bair PC

(57) ABSTRACT

A rearview mirror system comprising a passenger-side mirror having a lower natural frequency and/or more resiliency than the driver-side mirror.

10 Claims, 4 Drawing Sheets

| Base Material | E, G Pa | Mass Density, g/cm³ | Natural Frequency, Hz |
|---|---|---|---|
| Zinc | 85 | 6.6 | 95 |
| Plastic | 10 | 1.6 | 46 |

MIRROR SYSTEM WITH VARYING CHARACTERISTICS BASED ON VEHICLE POSITIONING

Matter enclosed in heavy brackets [ ] appears in the original patent but forms no part of this reissue specification; matter printed in italics indicates the additions made by reissue.

CROSS-REFERENCE TO RELATED APPLICATION

This application claims the benefit of U.S. provisional application Ser. No. 60/481,837, filed Dec. 29, 2003, which is incorporated herein in its entirety.

FIELD OF THE INVENTION

The invention relates to a rearview mirror system for a motor vehicle, and more particularly to a rearview mirror system comprising a lightweight mirror base exhibiting a reduced natural frequency of vibration.

DESCRIPTION OF THE RELATED ART

Rearview mirror systems are ubiquitous for motor vehicles, and can include both driver-side and passenger-side mirrors. The purpose of the rearview mirror system is to provide the driver with a rearward view during operation of the motor vehicle. The driver side mirror typically utilizes a flat reflective surface providing an image magnification of 1:1. In contrast, the passenger-side mirror typically utilizes a convex reflective surface to provide a wider field of view to the driver. This results in an image magnification of approximately 2:1. In other words, the field of view of the mirror is about 3× as that of a flat surface mirror. Often, this is the reason why the convex passenger side mirror carries a warning which reads: "Objects in the mirror are closer than they appear."

Federal law requires that driver-side mirrors be designed for a natural frequency of vibration equal to or greater than 60 Hz. Passenger-side mirrors are typically designed to this same standard, although this is not required by applicable law. Since the image in the convex mirror is comparatively small, the quality of the image will not be appreciably affected by mirror vibration as would the image in the driver-side mirror.

Mirror vibration is controlled to a great extent by the use of relatively heavy materials, particularly metals such as zinc, in the mirror base. The heavier material provides a higher natural frequency. However, the use of heavier material results in undesirable characteristics such as a heavier overall vehicle weight, increased mirror cost, and higher fuel consumption.

SUMMARY OF THE INVENTION

A passenger-side rearview mirror system comprising a convex reflective element has a relatively low natural frequency of vibration resulting from the use of a mirror base comprising a material having a relatively low modulus of elasticity and density as compared with a drivers-side rearview mirror.

In various aspects, the invention relates to a vehicular rearview mirror system for a motor vehicle having a driver's side and a passenger's side, a first rearview mirror assembly attached to the driver's side, and a second rearview mirror assembly attached to the passenger's side, comprising: a first reflective element assembly for providing a rearward view along the driver's side to the operator of the vehicle, the first reflective element having a first base assembly for attaching the first reflective element assembly to the exterior of the vehicle; and a second reflective element assembly for providing a rearward view along the passenger's side to the operator of the vehicle, the second reflective element assembly having a second base assembly for attaching the second reflective element assembly to the exterior of the vehicle.

The natural frequency of the second vehicular rearview mirror assembly can be less than the natural frequency of the first vehicular rearview mirror assembly. The second base assembly can be made from a material having more resiliency than the first base assembly.

Various embodiments of the invention are contemplated. The second reflective element assembly can have more convexity than the first reflective element assembly. The second base assembly can be formed at least in part from a polymeric material. The natural frequency of the first reflective element assembly can be at least 60 Hz and the natural frequency of the second reflective element assembly can be less than 60 Hz. The second reflective element assembly can comprise a plurality of components made from at least one of a polymeric material and a metallic material.

DESCRIPTION OF AN EMBODIMENT OF THE INVENTION

Figure 1:
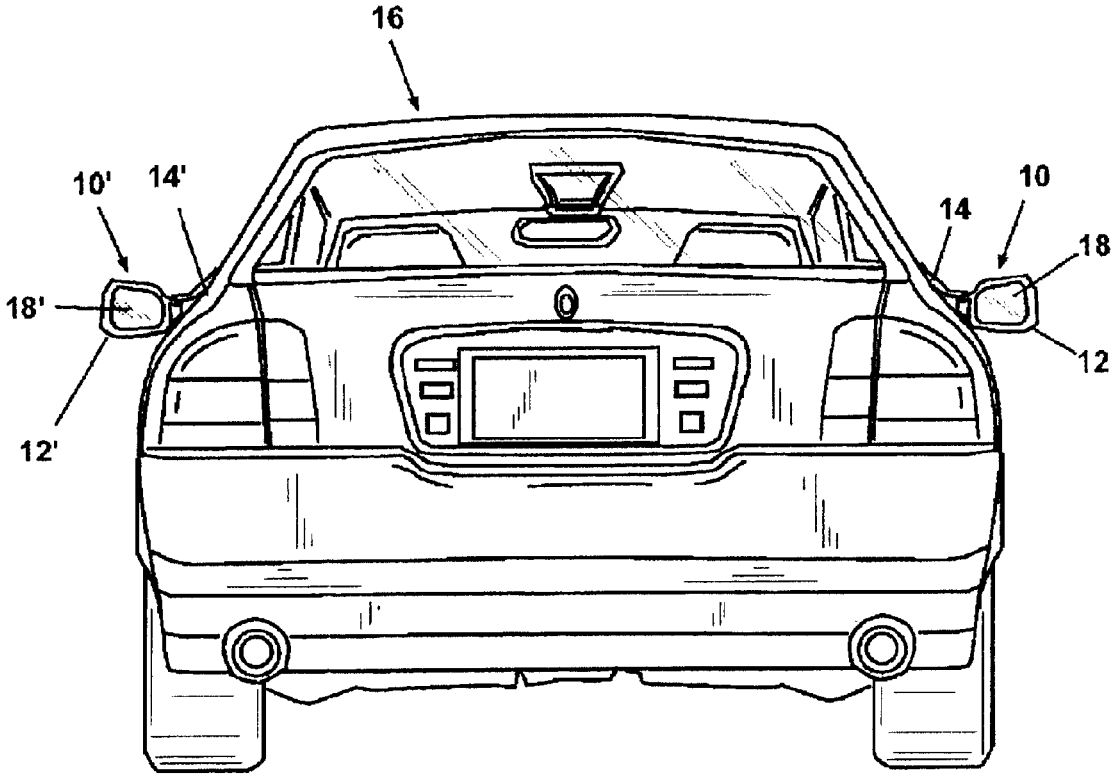
FIG. 1 is an elevational view from the rear of a motor vehicle comprising a driver-side rearview mirror system and a passenger-side rearview mirror system according to the invention, each rearview mirror system comprising a reflective element assembly attached to the motor vehicle through a base assembly.
Figure 2:
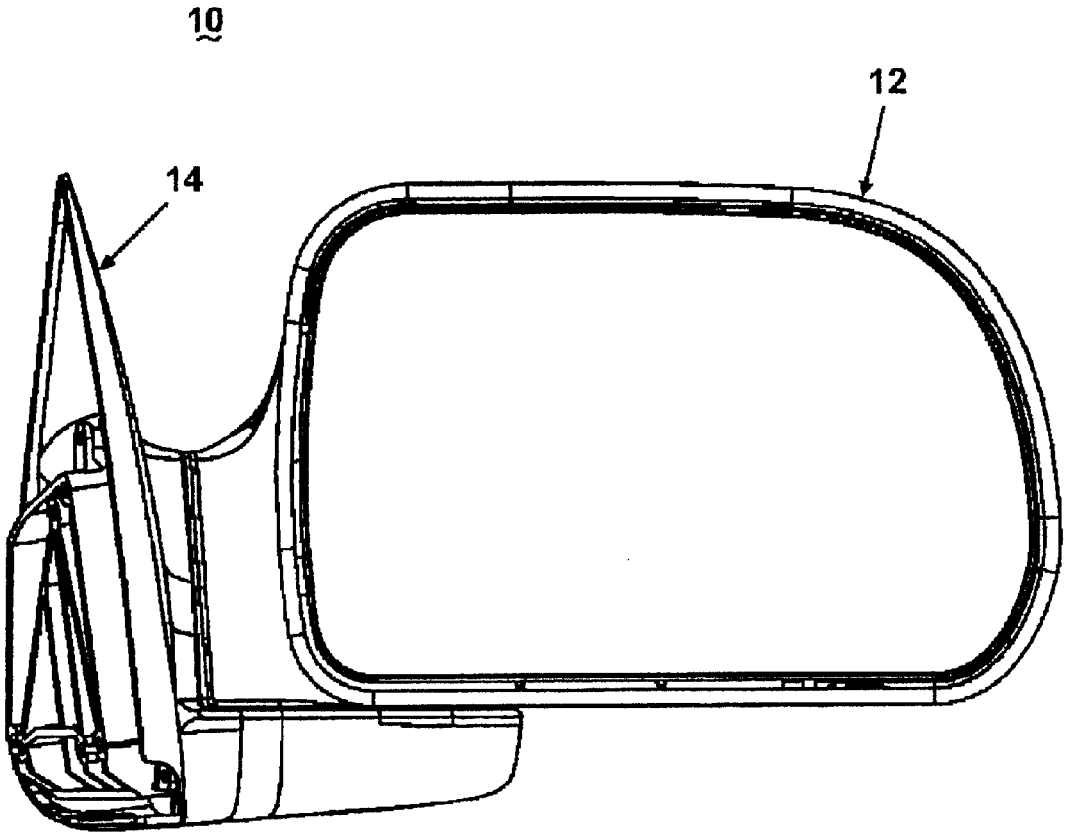
FIG. 2 is an enlarged view of the passenger-side rearview mirror system shown in FIG. 1.

Referring now to FIGS. 1 and 2, a motor vehicle 16 is shown from the rear having a passenger-side rearview mirror system 10 and a driver-side rearview mirror system 10' each of which is mounted to the vehicle 16 in a conventional manner. The passenger-side mirror system 10 comprises a convex reflective element assembly 12 providing an image 18 of an object located rearward of the vehicle. The driver side mirror system 10' comprises a planar reflective element assembly 12' providing an image 18' of the same object. The magnification provided by the driver side mirror system 10' is 1:1. The magnification provided by the passenger-side mirror system 10 is approximately 2:1.

The passenger-side reflective element assembly 12 is mounted to the motor vehicle 16 through a base assembly 14. The driver-side reflective element assembly 12' is mounted to the motor vehicle 16 through a base assembly 14'. The rearview mirror system 10, 10' can be adapted for pivotal connection of the reflective element assembly 12, 12' to the base 14, 14' for selective folding of the reflective element assembly 12, 12' against the vehicle 16. The pivotal connection can be manual or powered. The rearview mirror system 10, 10' can also be provided with enhanced functionality such as a defogger/defroster, turn indicators, a reflective element tilt actuator, and supplemental lights such as puddle lights. These functionalities can be electrically powered by the vehicle power system, and controlled by the driver from within the passenger compartment, in a well-known manner.

Figure 3:
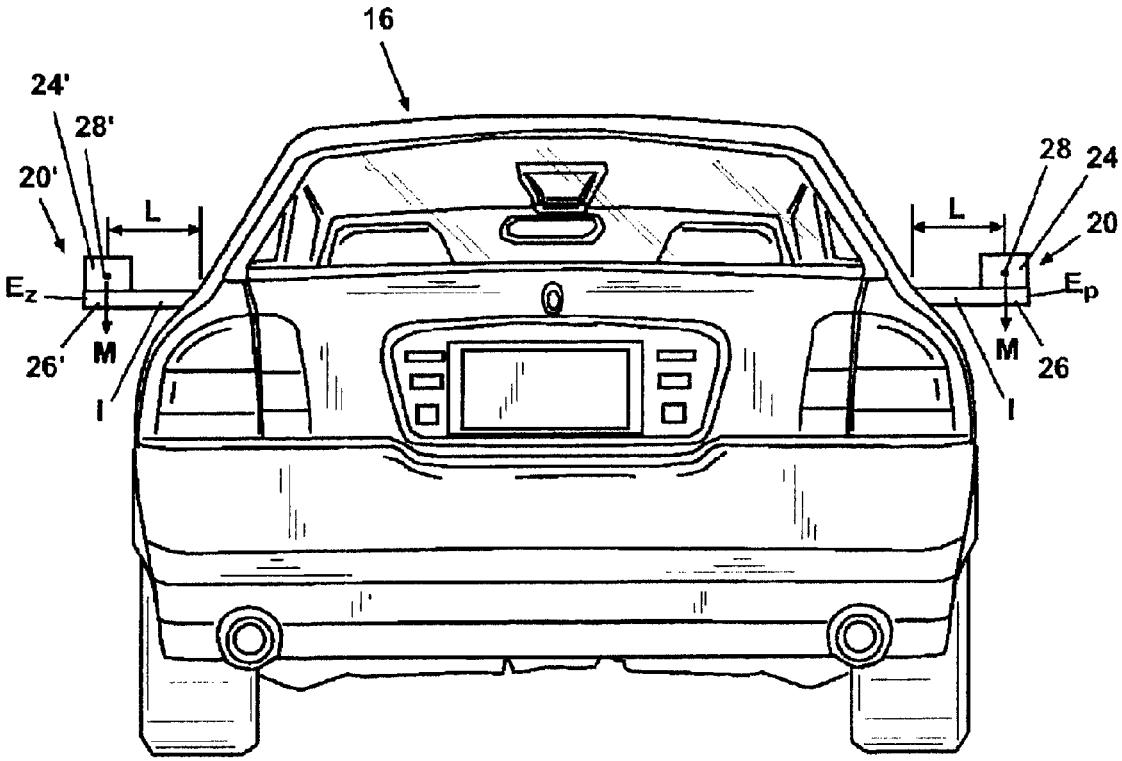
FIG. 3 is an elevational view similar to FIG. 1 showing each rearview mirror system idealized as a mass supported at the free end of a cantilever beam.
Figures 4, 5:
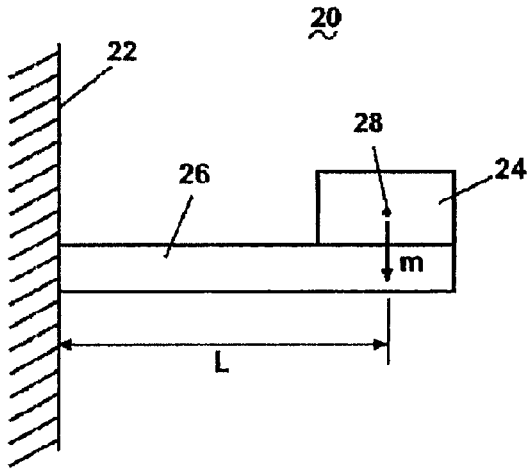
FIG. 4 is an enlarged view of the idealized passenger-side rearview mirror system shown in FIG. 3.
FIG. 5 is a table showing the natural frequency of the idealized rearview mirror system shown in FIG. 4 for a base assembly comprising alternative materials.

As shown in FIGS. 3 and 4, the mirror system 10, 10' can be idealized as an analytical model 20, 20', in which the mass M, m of the mirror system is represented by a mass 24 supported by a cantilever beam 26 at its free end which is rigidly attached at its fixed end to an immovable support base 22. The center of gravity 28 of the mass 24 is located a distance L from the support base 22. The cantilever beam 26 represents the base assembly 14. It will also be understood that the cantilever beam 26 can represent other components of a typical mirror system including, but not limiting to, a pivot bracket, or other well-known components used to support a reflective element with respect to a vehicle or mounting portion thereof.

The cantilever beam 26 has a modulus of elasticity E and a mass density ρ related to the material from which the beam (or, more precisely, the mirror base assembly) is fabricated. The beam 26 also has a moment of inertia I which is a function of the cross-sectional geometry of the beam 26.

The natural frequency $\omega_n$ of the system can be calculated from the following well-known relationship:

$$\omega_n = \sqrt{\frac{m}{k}}$$

or (for a cantilever beam):

$$\omega_n = \sqrt{\frac{3EI}{L^3 m}}$$

where $\omega_n$=natural frequency, Hz;

k=an effective spring constant for the mirror system which is typically modeled as a cantilever beam;

E=Young's modulus of elasticity, GPa;

I=moment of inertia, $cm^4$;

L=beam length, cm;

m=mass, g; and 1 unit of Pa−10 g·cm/$sec^2$.

FIG. 5 tabulates the results of the above calculation for both zinc and plastic. Mirror system base assemblies are frequently fabricated of zinc components. Plastics, particularly high-strength plastics, provide the advantage of lower weight. As can be seen, the natural frequency of the mirror system idealized in FIG. 4 comprising a zinc cantilever arm is 95 Hz, well above a value of 60 Hz required for driver-side mirrors. The natural frequency of the same mirror system comprising a plastic cantilever arm is 46 Hz, which is below the 60 Hz required for driver-side mirrors, but acceptable for convex passenger-side mirrors. At 46 Hz, an image in a convex passenger-side mirror system will not be appreciably distorted by vibration of the mirror system. While FIG. 5 presents a comparison of results for plastic, other lightweight materials providing a suitable combination of strength and weight can be used.

The vibration characteristics of the mirror system can be further controlled by selective use of plastic and/or metal components. For example, the use of plastic in a particular base assembly configuration can be maximized in order to achieve the lowest possible natural frequency where stiffness is not an issue. Conversely, where stiffness considerations predominate, or where weight is of lesser concern, plastic can be used in selected components making up the base assembly while maintaining the use of zinc for other components in the base assembly. The less restrictive natural frequency specification for a passenger-side mirror system enables the use of alternative lightweight materials, alone or in combination with metals, to achieve a desired balance between frequency performance, stiffness, and mass.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A vehicular rearview mirror system for a motor vehicle having a driver's side and a passenger's side, comprising:

a first rearview mirror assembly attached to the driver's side for providing a rearward view along the driver's side to the operator of the vehicle, a first planar reflective element assembly comprising a first planar reflective element, a first base assembly fabricated of a first material having a first modulus of elasticity for attaching the first planar reflective element assembly to the exterior of the vehicle, and a first cantilever arm coupling the first planar reflective element assembly to the first base assembly;

a second rearview mirror assembly attached to the passenger's side for providing a rearward view along the passenger's side to the operator of the vehicle, a second non-planar reflective element assembly comprising a second non-planar reflective element, a second base assembly fabricated of a second material having a second modulus of elasticity for attaching the second non-planar reflective element assembly to the exterior of the vehicle, and a second cantilever arm coupling the second non-planar reflective element assembly to the second base assembly;

wherein said second modulus of elasticity is substantially less than said first modulus of elasticity; and whereby the natural frequency of said [first planar] *second non-planar* reflective element assembly supported by said [first] *second* cantilever arm on said [first] *second* base assembly is substantially less than the natural frequency of said [second non-planar] *first planar* reflective element assembly supported by said [second] *first* cantilever arm on said [second] *first* base assembly.

2. The vehicular rearview mirror system of claim 1 wherein the second base assembly is made from a material having more resiliency than the first base assembly.

3. The vehicular rearview mirror system of claim 2 wherein the second non-planar reflective element is a convex reflective element.

4. The vehicular rearview mirror system of claim 3 wherein the second base assembly is formed at least in part from a polymeric material.

5. The vehicular rearview mirror system of claim 4 wherein the natural frequency of the first planar reflective element assembly is at least 60 Hz and the natural frequency of the second non-planar reflective element assembly is less than 60 Hz.

6. The vehicular rearview mirror system of claim 5 wherein the second non-planar reflective element assembly comprises a plurality of components made from at least one of a polymeric material and a metallic material.

7. The vehicular rearview mirror system of claim 1 wherein the second non-planar reflective element is a convex reflective element.

8. The vehicular rearview mirror system of claim 1 wherein the second base assembly is formed at least in part from a polymeric material.

9. The vehicular rearview mirror system of claim 1 wherein the natural frequency of the first planar reflective element assembly is at least 60 Hz and the natural frequency of the second non-planar reflective element assembly is less than 60 Hz.

10. The vehicular rearview mirror system of claim 1 wherein the second non-planar reflective element assembly comprises a plurality of components made from at least one of a polymeric material and a metallic material.

* * * * *